United States Patent [19]

Fujimori et al.

[11] 4,296,841
[45] Oct. 27, 1981

[54] ANTIRATTLE SPRING FOR A DISC BRAKE OF VEHICLES

[75] Inventors: Fumio Fujimori; Masatada Yokoi; Masakazu Ishikawa; Hiroshi Uemura; Akira Shirai, all of Aichi, Japan

[73] Assignees: Aisin Seiki Kabushiki Kaisha, Kariya; Toyota Jidosha Kogyo Kabushiki Kaisha, Toyota, both of Japan

[21] Appl. No.: 117,358

[22] Filed: Jan. 31, 1980

Related U.S. Application Data

[63] Continuation of Ser. No. 868,214, Jan. 9, 1978, Pat. No. 4,214,649.

[30] Foreign Application Priority Data

Jan. 8, 1977 [JP] Japan ................................. 52-1095

[51] Int. Cl.$^3$ ........................................... F16D 65/04
[52] U.S. Cl. .............................. 188/73.38; 188/73.1; 188/250 B
[58] Field of Search ................. 188/72.4, 73.1, 73.3, 188/73.5, 205 A, 250 B, 250 F

[56] References Cited

U.S. PATENT DOCUMENTS

| | | | |
|---|---|---|---|
| 3,463,275 | 8/1969 | Soltis | 188/205 A |
| 3,625,314 | 12/1971 | Riuker | 188/72.4 |
| 3,712,423 | 1/1973 | Girauldon | 188/73.5 |
| 3,941,216 | 3/1976 | Burgdorf | 188/72.4 |
| 3,958,667 | 5/1976 | de Gennes | 188/73.1 |
| 3,977,499 | 8/1976 | Johannesen | 188/73.5 |
| 3,998,296 | 12/1976 | James | 188/73.5 |
| 4,002,226 | 1/1977 | Rainbolt et al. | 188/73.3 |

FOREIGN PATENT DOCUMENTS

| | | | |
|---|---|---|---|
| 1945582 | 3/1971 | Fed. Rep. of Germany | 188/73.3 |
| 7512374 | 4/1977 | Netherlands | 188/73.5 |
| 984315 | 2/1965 | United Kingdom | 188/205 A |

*Primary Examiner*—Edward R. Kazenske
*Attorney, Agent, or Firm*—Oblon, Fisher, Spivak, McClelland & Maier

[57] ABSTRACT

An antirattle spring for a disc brake is represented as being entirely disposed outside of a clearance between one of a plurality of edges of pad assemblies and a stationary member anchoring against the one edge. Consequently, the antirattle spring is freed from any restraint as would otherwise be imposed upon a designer of a more complicated and smaller sized configuration of the spring, and is therefore more likely to retain its resiliency than are prior art antirattle springs. The antirattle spring has one end thereof bolted to the stationary member and the other end thereof engaging one of the plurality of edges with a required elastic energy stored within the middle portion of the spring.

5 Claims, 3 Drawing Figures

ANTIRATTLE SPRING FOR A DISC BRAKE OF VEHICLES

This is a continuation, of application Ser. No. 868,214, filed Jan. 9, 1978, now U.S. Pat. No. 4,214,649.

BACKGROUND OF THE INVENTION

1. Field of the Invention

This invention relates to an anti-rattle spring for a disc brake of the type in which at least one friction element is directly slidably mounted on a torque-taking member and a hyraulic fluid acting means is provided in a caliper form so as to straddle a peripheral portion of a friction disc or rotor together with the pad assemblies engaging the opposite faces of the rotor. The terms "spot type disc brake" as used usually in the art, refer to the above mentioned type of the brake.

2. Description of the Prior Art

In the spot type disc brake, it is customary that one or either pad assembly is directly mounted on a pair of arms which are circumferentially spaced and extend from the torque-taking member in the axial direction of the rotor, so that the pad assembly may slide on the arms by being urged by the hydraulic fluid acting means into engagement with the corresponding friction face of the rotor.

In order to prevent the pad assembly from corrosion as would become affixed to the pad assembly and the arms together so as to defeat the purpose of sensitive and prompt response of the brake, a suitable width clearance is usually formed between the anchoring face of one of the arms and the correspondingly engaging face of the edge of the pad assembly. Since this clearance tends to permit relative movement between the pad assembly and the arms and accordingly results in a rattle or noises which may be annoying to the passengers, particularly when the vehicle traverses uneven terrain, it has become customary to provide an antirattle spring which restrains the relative movement when the brake is in a rest position.

However, the antirattle spring currently in use is formed to be inserted entirely or at least partially into the clearance which is usually narrow. This is apt to cause the antirattle spring to structurally interfere with its associating parts and results in being inadequately sized for want of space when the spring is designed. It has therefore been difficult in the art to provide a sufficient resiliency such that the antirattle spring may be compressed and relaxed for an indefinite number of cycles without losing its resiliency during the service life of the brake.

SUMMARY OF THE INVENTION

A principal object of the invention is to provide an antirattle spring for a disc brake which is located entirely out of a clearance formed between an anchoring face of one of the arms and one of the edges of the pad assembly and consequently is freed from any restrain as would otherwise be imposed in the design of a complicated and smaller sized configuration upon the antirattle spring.

Another object of the invention is to provide an antirattle spring which is freed from structural interfering with its associating parts and accordingly is enabled to be readily designed to provide a required resiliency regardless of the narrow clearance.

Another object of the invention is to provide an antirattle spring for a disc brake of extremely of simple design for substantial saving in manufacturing costs.

Thus, in the embodiment of the invention there is combined, a torque-taking member to be secured to a stationary part of a vehicle body, a friction disc to be rotated with the vehicle wheel, a pair of arms extending from the torque-taking member in axial direction of rotation of the friction disc and circumferentially spaced to define a recess therebetween, a pair of pad assemblies at least one of which is directly slidably mounted on the arms within the recess, and an antirattle spring normally spring-biasing the pad assembly toward anchoring to one of the arms which takes torque when the vehicle is traveling in a preferably forward direction. The recess is designed to be large enough to receive therein the directly slidably mounted pad assembly with a clearance between one of the anchoring faces of the arms and one of the edges of that pad assembly when the latter is biased toward anchoring to the opposite arm by the torque. The clearance is calculated in design to be large enough to prevent the pad assembly from being afixed to one of the arms due to corrosion by being repeatedly reciprocated the distance of the clearance. The antirattle spring is further characterized in that the same is located entirely out of the clearance without having any portion inserted into the clearance while normally urging the pad assembly to one of the anchoring faces with a result that the resiliency thereof is readily provided in design for bearing against an indefinite number of cycles of deformation caused by the reciprocation of the pad assembly.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein.

DESCRIPTION OF THE PREFERRED EMBODIMENT

Figure 1:
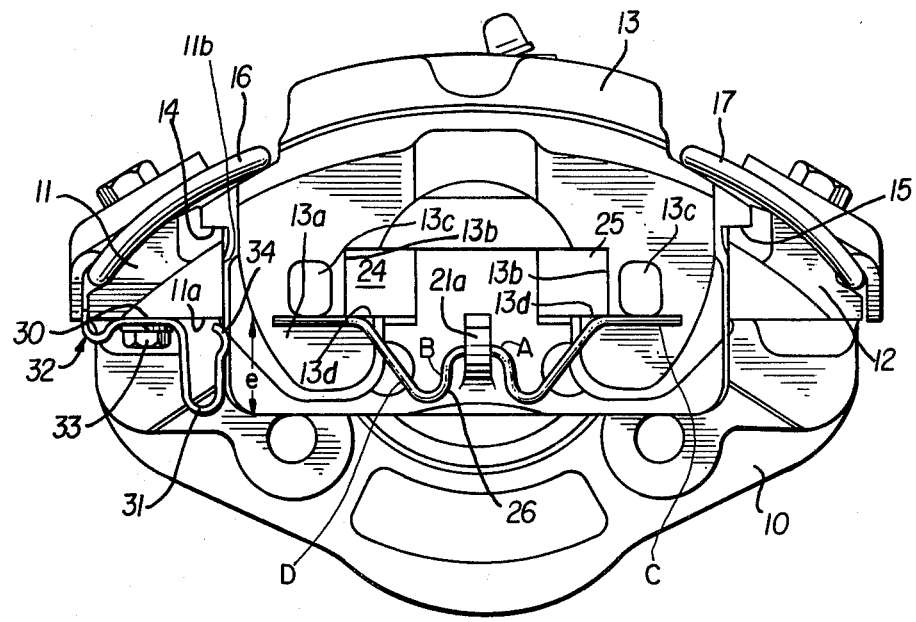
FIG. 1 is a side elevational view of a disc brake having an antirattle spring according to the invention.
Figure 3:
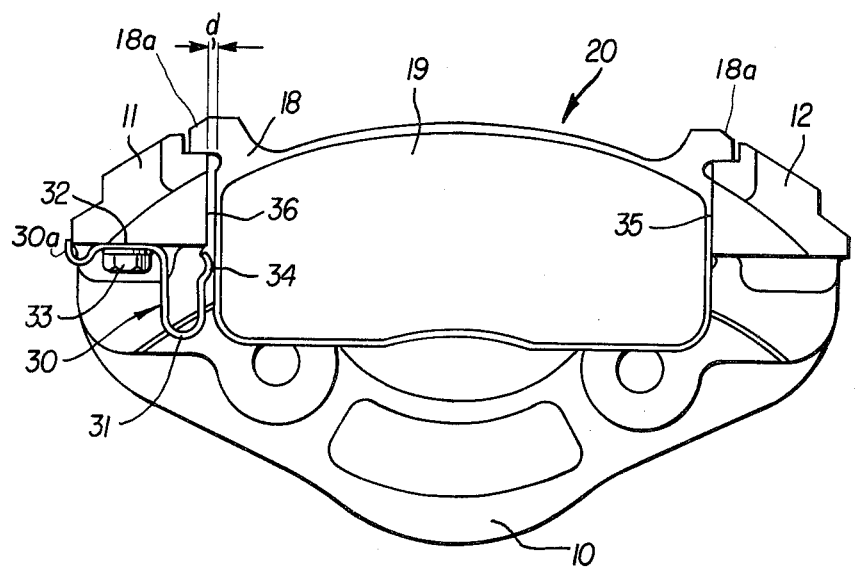
FIG. 3 is a similar view to that of FIG. 1, but parts are detached therefrom for illustration convenience.
Figure 2:
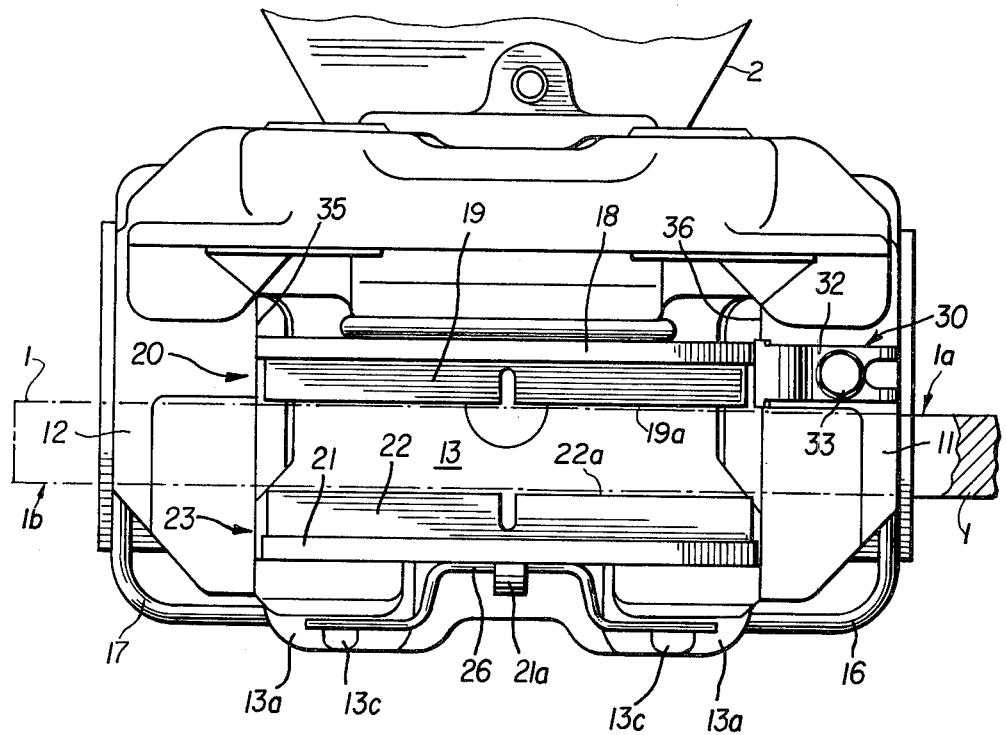
FIG. 2 is a plan view of the disc brake of FIG. 1.

Referring now to FIGS. 1 to 3, a brake assembly according to the present invention includes a rotor or friction disc 1 having opposed friction faces 1a, 1b. A torque taking member generally indicated at 10 is to be secured to a stationary part 2 of a vehicle wheel (not shown) and includes a pair of circumferentially spaced, axially extending and parallel arms 11 and 12 which define therebetween, a recess adapted to receive therein a pad assembly 20. The arms 11 and 12 respectively define inner edges 14 and 15 on which the pad assembly 20 is free to slide in the direction normal to the plane of FIG. 1.

A caliper 13 includes a known housing defining a bore (not shown) therewithin which slidably receives an actuating piston (not shown). The caliper 13 is prevented from rattling by a pair of spring members 16 and 17 of the known loop type which is conventional and considered to need no further description.

As shown in FIG. 2, the pad assembly 20 is formed of a backing plate 18 having projections 18a and a friction member 19 with friction face 19a and disposed between the rotor and the actuating piston adjacent one face of the rotor. Another pad assembly 23 is formed of a backing plate 21 and a friction member 22 with friction face 22a and is disposed adjacent the opposite face of the rotor. The pad assembly 23 is carried by radially inwardly extending portions 13a which extend from a bridge portion of the caliper and is disposed adjacent the friction face of the rotor. In detail, as shown in FIG. 1, the backing plate 21 is provided with a pair of projections 24 and 25 extending outwardly therefrom and being in close fitted sliding relation with notches 13b on the internal faces of the inwardly extending portions 13a. A spring member 26 is adapted to keep the friction element 23 in position particularly when the brake is being assembled. The middle portion A of the spring member 26 is clamped by being inserted into a close fitting hole or receiving portion (not shown) in a projection 21a of the backing plate 21 and either extremity is in resiliently abutment relation with the plate 21 while being restrained from upward free movement by a pair of projections 13c in the portions 13a. The spring member 26 normally spring-biases the projections 24 and 25 toward abutment against the lower edges 13d of the notches 13b so that the pad assembly 23 is prevented from rattling when the brake is in a rest position and the vehicle is traveling.

Spring member 26 therefore includes a middle portion A, a pair of parallel radially extending portions spaced radially outwardly from middle portion A, opposite end portions C and intermediate portions D interconnecting the opposite end portions C with the pair of radially extending portions B, respectively. An antirattle spring generally indicated by reference numeral 30 at the left in FIG. 1 is disposed on a bottom downward facing face 11a of fhe arm 11 by being bolted by a bolt 33 at its foot 32. Arm 11 also includes an upright face portion 11b. As seen in FIG. 1 and FIG. 2 (at the right), the spring member 30 includes a rim portion 30a formed from a ribbon-like sheet metal into a profile shown in FIGS. 1 and 3. The loop-shaped body portion 31 in the middle portion of the spring member 30 is adapted to store elastic energy therewithin when installed for urging the backing plate 18 along marginal portion e thereof to the arm 12 by the free end 34 of the spring. The backing plate 18 is accordingly spring-biased toward anchoring against a vertical anchoring face 35 (at the right in FIG. 3) of the arm 12 while forming a clearance between a vertical anchoring face 36 of the arm 11 and the left edge of the backing plate 18 as seen in FIG. 3 when the brake is in rest position or when the vehicle is traveling in the forward direction and a brake application is effected.

By calculating a resiliency which is suitable, the antirattle spring 30 completely enables prevention of the pad assembly 20 from rattling in the case of the rest position of the brake even though the vehicle is traveling or traversing uneven terrain.

When the vehicle is traveling in the reverse direction and brake application is effected, the pad assembly 20 is moved to the left due to a drag force until the same anchors against the anchoring face 36, thereby stressing the loop-shaped body portion 31 of the anti-rattle spring 30. In operation, a clearance substantially being the same as that marked d in FIG. 3 is also formed between the edge of the backing plate 18 and the anchoring face 35 of the arm 12. Since such operation is repeated almost every time the vehicle reversely travels, the tendency to produce a corrosion becomes nil so that any fear that the pad assembly and the arm will be afixed to each other due to the corrosion is nearly alleviated.

It should be noted that the rattle preventing spring according to the invention is applicable to such a brake in which both pad assemblies are directly mounted on the arms without departing from the principle of the present invention.

Obviously many modifications and variations of the present invention are possible in light of the above teachings. It is therefore to be understood that within the scope of the appended claims, the invention may be practiced otherwise than as specifically described herein.

What is claimed is:

1. A disc brake having a rotor including a pair of opposed friction faces, comprising:
   a fixed torque taking member;
   a pair of frictional elements, respectively disposed adjacent the opposite friction faces of the rotor;
   a caliper straddling a part of said rotor together with said friction elements and free to slide on said torque taking member in the direction of the axis of rotation of the rotor;
   hydraulic fluid acting means incorporated into said caliper and adapted to respectively urge said friction elements to the opposite friction faces of said rotor;
   a pair of radially extending portions projecting from said caliper which includes internal faces and connecting with one of said friction elements;
   a resilient member comprising a middle portion, a pair of radially extending portions extending radially inwardly from opposite ends of said middle portion, opposite end portions spaced radially outwardly from said middle portion and intermediate portions interconnecting said opposite end portions with said pair of radially extending portions, respectively, said resilient member being sustained at said middle portion thereof by said one of said friction elements and resiliently abuts said radially extending portions of said caliper at said opposite end portions thereof to thereby normally urge said one of said friction elements toward abutment against said internal faces of said radially extending portions of said caliper, wherein said radially extending portions of said caliper, respectively, include a pair of axially extending projections for restraining said opposite end portions of said resilient member from upward free movement and wherein said one of said friction elements includes a projection formed at a middle part thereof and having a receiving portion formed therein such that said resilient member is force fitted in said receiving portion;
   said resilient member comprising a single wire;
   a pair of notches formed in said radially extending portions of said caliper;
   a pair of circumferentially spaced projections on said one of said pair of friction elements respectively slidably fitted in said pair of notches; and
   said resilient member being bent at both ends of said middle portion to form said pair of radially extending portions which abut said one of said friction elements; said intermediate portions, said pair of radially extending portions and said pair of axially extending projections of said caliper restraining said opposite end portions from radial free movement while radially urging said one of said friction elements against said pair of notches at said pair of projections.

2. A disc brake as set forth in claim 1, wherein said middle portion is located between said pair of radially extending portions and both said opposite end portions of said resilient member.

3. A disc brake as set forth in claim 1, wherein said middle portion and both said opposite end portions of said resilient member are located apart from each other in the direction of the radius of said rotor as well as in the direction of the rotational axis of said rotor.

4. A disc brake as set forth in claim 1, said receiving portion comprising a hole formed in said projection.

5. A disc brake as set forth in claim 1, wherein said pair of radially extending portions are parallel.

* * * * *